United States Patent
Kang et al.

(10) Patent No.: US 10,975,923 B2
(45) Date of Patent: Apr. 13, 2021

(54) PLASTIC COMPOSITE CONTAINING MAGNETIC ALLOY POWDER, AIR CONDITIONER COMPRESSOR HAVING THE SAME AND METHOD OF PRODUCING THEM

(71) Applicants: Hyundai Motor Company, Seoul (KR); Kia Motors Corporation, Seoul (KR)

(72) Inventors: Hee-Sam Kang, Seoul (KR); Tae-Ho Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 67 days.

(21) Appl. No.: 16/214,319

(22) Filed: Dec. 10, 2018

(65) Prior Publication Data

US 2019/0203780 A1    Jul. 4, 2019

(30) Foreign Application Priority Data

Dec. 29, 2017    (KR) .................. 10-2017-0183529

(51) Int. Cl.
*F16D 27/00*        (2006.01)
*B22F 7/08*         (2006.01)
(Continued)

(52) U.S. Cl.
CPC .......... *F16D 27/004* (2013.01); *B22F 1/0059* (2013.01); *B22F 3/225* (2013.01);
(Continued)

(58) Field of Classification Search
CPC ...... F16D 27/004; F16D 27/112; F16D 27/14; F16D 13/76; F16D 2250/0015;
(Continued)

(56) References Cited

U.S. PATENT DOCUMENTS 4,952,331 A * 8/1990 Okimoto ............. C22C 32/0042
                                                    252/62.54
6,387,293 B1 * 5/2002 Akioka .................. H01F 1/0558
                                                    252/62.54
(Continued)

FOREIGN PATENT DOCUMENTS

GB       2019960 A    11/1979
JP       S54-4940 A    1/1979
(Continued)

OTHER PUBLICATIONS

Isotani, Keita, et. al. Machine Translation JP2003100509 Magnetic Core and Inductance Part Using the Same. Espacenet. (Year: 2003).*

(Continued)

*Primary Examiner* — Charles A Fox
*Assistant Examiner* — Lori Wu
(74) *Attorney, Agent, or Firm* — Mintz Levin Cohn Ferris Glovsky and Popeo, P.C.; Peter F. Corless

(57) ABSTRACT

Disclosed is a plastic composite including a magnetic alloy material in an amount of about 20% by volume or greater on the basis of the total volume of the plastic composite. Accordingly, weight of the clutch may be reduced by about 0.4 kg and weight of the pulley can be reduced by about 0.4 kg with the result that overall weight may be reduced by about 0.8 kg.

13 Claims, 5 Drawing Sheets

(51) Int. Cl.
| | |
|---|---|
| *B22F 3/22* | (2006.01) |
| *B22F 1/00* | (2006.01) |
| *F04B 35/01* | (2006.01) |
| *H01F 1/113* | (2006.01) |
| *F16H 55/36* | (2006.01) |
| *F16D 13/76* | (2006.01) |
| *F16D 27/112* | (2006.01) |
| *B29C 45/14* | (2006.01) |
| *F16D 27/14* | (2006.01) |
| *F04B 35/04* | (2006.01) |
| *H01F 1/055* | (2006.01) |
| *B29K 505/08* | (2006.01) |
| *B29K 705/02* | (2006.01) |
| *B29L 31/32* | (2006.01) |
| *F16D 121/20* | (2012.01) |

(52) U.S. Cl.
CPC .......... *B22F 7/08* (2013.01); *B29C 45/14311* (2013.01); *F04B 35/01* (2013.01); *F16D 13/76* (2013.01); *F16D 27/112* (2013.01); *F16D 27/14* (2013.01); *F16H 55/36* (2013.01); *H01F 1/113* (2013.01); *B29C 2045/14868* (2013.01); *B29K 2505/08* (2013.01); *B29K 2705/02* (2013.01); *B29K 2995/0008* (2013.01); *B29L 2031/32* (2013.01); *C22C 2202/02* (2013.01); *F04B 35/04* (2013.01); *F16D 2121/20* (2013.01); *F16D 2250/0015* (2013.01); *F16D 2250/0038* (2013.01); *H01F 1/0558* (2013.01)

(58) Field of Classification Search
CPC ............ F16D 2250/0038; B22F 1/0059; B22F 3/225; B22F 7/08; F16H 55/36; F16H 55/42; F16H 55/48; F16H 55/46; H01F 1/0058; H01F 1/09; H01F 1/113; F04B 35/01; F04B 35/04
See application file for complete search history.

(56) References Cited

U.S. PATENT DOCUMENTS

| | | | |
|---|---|---|---|
| 9,443,653 B2* | 9/2016 | Furuta | B32B 7/12 428/414 |
| 2015/0167766 A1* | 6/2015 | Kado | B32B 7/12 428/414 |
| 2015/0292573 A1* | 10/2015 | Yamagami | F16D 27/112 192/84.9 |

FOREIGN PATENT DOCUMENTS

| | | |
|---|---|---|
| JP | S59-94405 A | 5/1984 |
| JP | S59-86436 U | 6/1984 |
| JP | H06-244047 A | 9/1994 |
| JP | 2002-062671 A | 2/2002 |
| JP | 2002-078251 A | 3/2002 |
| JP | 2003-100509 A | 4/2003 |
| JP | 2008-017227 A | 1/2008 |
| KR | 2009-0020848 A | 2/2009 |
| KR | 2015-0057656 A | 5/2015 |
| KR | 2017-0070386 A | 6/2017 |

OTHER PUBLICATIONS

Extended European Search Report received for EP Patent Application No. 18212644.1, dated Jul. 3, 2019, 19 pages.
Sharma (Apr. 1, 2012) "A Study of hybrid bonded magnets of Sm—Co and Sr-ferrite using a mixture design", Journal of Applied Physics, 111(7):4 pages.

* cited by examiner

PLASTIC COMPOSITE CONTAINING MAGNETIC ALLOY POWDER, AIR CONDITIONER COMPRESSOR HAVING THE SAME AND METHOD OF PRODUCING THEM

CROSS-REFERENCE(S) TO RELATED APPLICATIONS

This application claims priority to Korean Patent Application No. 10-2017-0183529 filed on Dec. 29, 2018, which is incorporated herein by reference in its entirety.

TECHNICAL FIELD

The present invention relates to an air conditioner compressor including an aluminum pulley and a steel clutch, which includes plastic composites.

BACKGROUND OF THE INVENTION

In a general clutchless type variable compressor, a rotating body of the compressor composed of a swash plate, a hub and a rotor is always driven by rotational force transmitted from a pulley connected to an engine belt. However, power is continuously consumed even when an air conditioner is not turned on. Therefore, a clutch type variable compressor to which a clutch is added to increase driving efficiency of air conditioner compressors has been utilized.

Such a clutch type variable compressor is composed of a steel pulley, a steel clutch, a frictional material formed on a bottom-end surface of the steel pulley, an electromagnetic induction coil and the like. In other words, it further includes the steel clutch to be incorporated between the steel pulley and the rotating body. Therefore, this type compressor may increase efficiency by eliminating unnecessary consumption of power, which may be wasted during rotation of the rotating body through cutting off power transmitted from the pulley to the rotating body when the air conditioner is not operated.

However, in such clutch type variable compressor, the steel clutch is operated by magnetic field induced by the electromagnetic induction coil. Therefore, weight and/or cost may be increased due to addition of the electromagnetic induction coil and the steel clutch. Further, since the steel pulley also has to be magnetized, weight may not be reduced by changing a steel material to an aluminum material.

SUMMARY OF THE INVENTION

In preferred aspects, the present invention provides a plastic composite including a magnetic alloy material replacing a steel material with an aluminum material to reduce weight and an air conditioner compressor including the same. Preferably, the magnetic alloy material may include a powder. The magnetic alloy material may be in a form of powder.

Further, provided is a plastic composite containing magnetic alloy material may reducing weight and/or cost even when an electromagnetic induction coil and a clutch are included in an air conditioner compressor.

In an aspect, provided is a plastic composite including a magnetic alloy material that can provide a way of replacing a steel material with an aluminum material to reduce weight.

The term "magnetic" is meant by possessing a property that may be related to, or respond to a magnetism, for example, by earth's magnetic field or other magnetic materials, or to an electric field creating a magnetism. Exemplary magnetic property may be characterized by a ferromagnetic material, for example, iron, which may be used to producing a permanent magnet.

The term "alloy" is meant by a metallic material including two or more of metal components, which may be bonded by metallic bond therebetween. In certain embodiments, the alloy may further include non-metallic elements such as carbon, sulfur, silicon, phosphorus, oxygen, or nitrogen, which may not be particularly limited. Exemplary alloy may contain iron or aluminum as main components constituting greater than about 90% by weight, about 92% by weight, about 95% by weight or about 98% by weight of the total weight of the alloy. In certain preferred embodiments, the alloy may be a steel alloy containing iron as a main component constituting greater than about 90% by weight, about 92% by weight, about 95% by weight or about 98% by weight of the total weight of the alloy.

The plastic composite may suitably include the magnetic alloy material in an amount of about 20% by volume or greater on the basis of the total volume of the plastic composite.

The magnetic alloy material may suitably include a ferrite magnetic powder. The ferrite magnetic powder may suitably include iron, cobalt, nickel or alloys thereof.

The magnetic alloy material may further comprise rare earth-based magnetic alloy material.

Further, the plastic composite may include the rare earth-based magnetic alloy material in an amount of about 10% by volume. The content of the ferrite magnetic powder may suitably be about 10 to 11% by volume.

Further, the rare earth-based magnetic alloy material may be a rare earth-cobalt magnetic material.

In an aspect of the present invention, provided is an air conditioner compressor that may include a pulley including the plastic composite as described above disposed inside thereof; and a clutch including a contact portion including the plastic composite in contact with a bottom-end surface of the pulley.

In addition, a thinnest portion of a surface area adjacent to an electromagnetic induction coil may have a thickness of at least about 3 mm.

In addition, the plastic composite may be formed inside the steel material and a shape of a cross-section area of the plastic composite may include an upper end longer than a lower end. Further, the shape may be an "I" shape of which the upper end is longer than the lower end, a "T" shape that is getting wider toward its lower end, or a "T" shape having a hexagonal shaped lower end.

In an aspect, provided is a method of producing an air conditioner compressor. The method may include: applying the plastic composite as described above to a pulley of the air conditioner compressor to make a plastic composite structured pulley; and applying the plastic composite to a clutch of the air conditioner compressor to make a plastic composite structured clutch.

The method may further include preparing the pulley by laminating the plastic composite on an aluminum material.

The method may further include preparing the clutch by laminating the plastic composite on a surface of a straight plane of a steel material.

Further, the method may include preparing the clutch by forming dimples on a surface of the steel material and laminating the plastic composite on the dimpled surface of the steel material by means of injection molding such that bonding force is reinforced through enlargement of surface area.

The dimpled surface may be formed by injecting steel balls or ceramic balls at high speed.

The plastic composite may be formed inside the steel material and a shape of a cross-section area of the plastic composite may include an upper end longer than a lower end. The shape may suitably have an "I" shape of which upper end is longer than its lower end, a "T" shape that is getting wider toward its lower end, or a "T" shape having a hexagonal shaped lower end.

According to various exemplary embodiments of the present invention, weight of the clutch may be reduced, for example, by about 0.4 kg and weight of the pulley may be reduced, for example, by about 0.4 kg with the result that overall weight may be reduced, for example, by about 0.8 kg.

In addition, shock noise (i.e., ticking noise) at a metallic interface and slipping phenomenon occurring when the clutch is driven may be improved and prevented.

Further, the manufacturing cost may be reduced by virtue of downsizing the clutch, using the aluminum pulley, removing the frictional material and the like.

It is to be understood that both the foregoing general description and the following detailed description of the present invention are exemplary and explanatory and are intended to provide further explanation of the invention as claimed.

Other aspects of the invention are disclosed infra.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
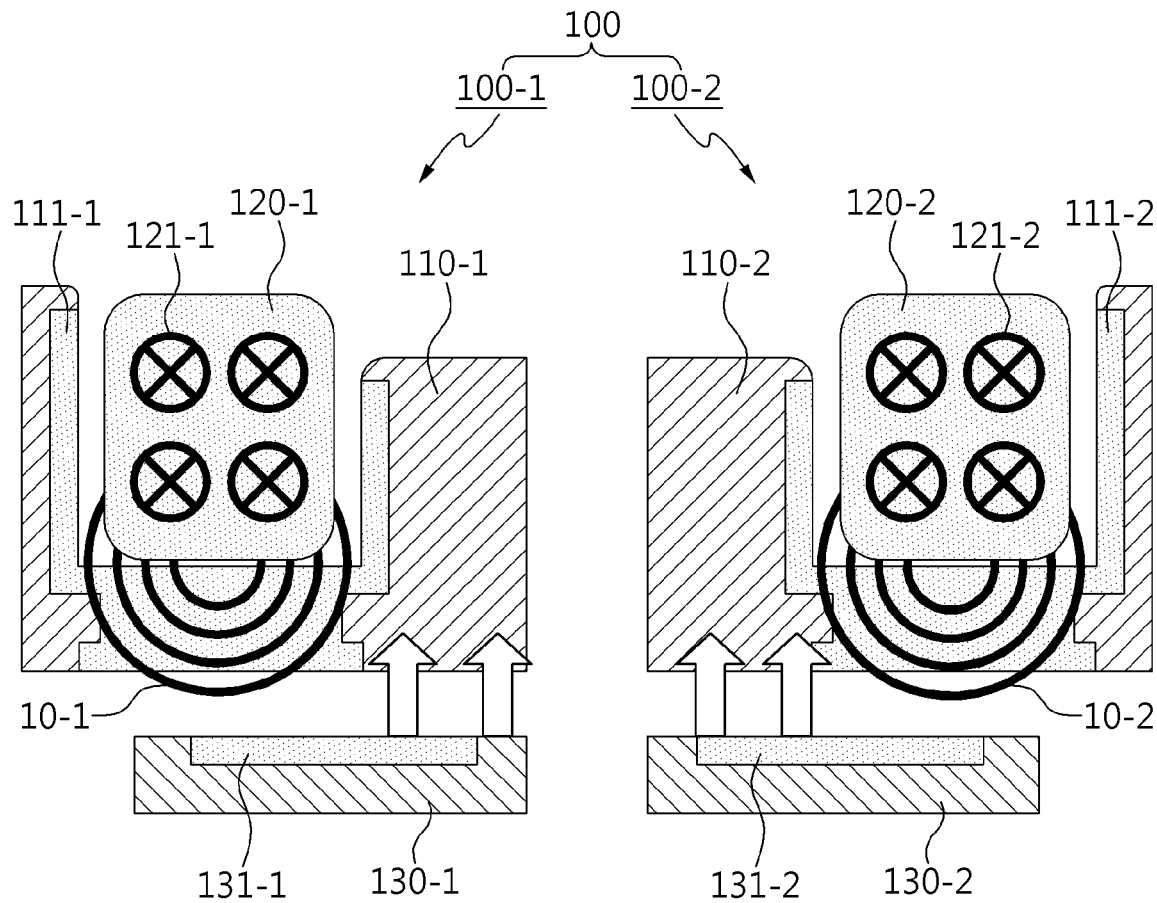
FIG. 1 is an exemplary air conditioner compressor according to an exemplary embodiment of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a plastic composite containing magnetic alloy material and an air conditioner compressor having the same, which are related to the present invention, will be described in detail with reference to the drawings. In this specification, the same or similar reference numerals are given to the same or similar configurations even in different embodiments and thus description thereof is replaced with the preceding description associated with them.

FIG. 1 shows an exemplary air conditioner compressor 100 according to an exemplary embodiment of the present invention. As shown in FIG. 1, the air conditioner compressor 100 may include a first assembly 100-1 and a second assembly 100-2. The first assembly 100-1 may include a first pulley 110-1 including a plastic composite 111-1 disposed inside thereof, a first core 120-1 including a first electromagnetic induction coil 121-1 disposed in an internal space of the first pulley 110-1, and a clutch 130-1 including a contact portion including a plastic composite 131-1 in contact with a bottom-end surface of the first pulley 110-1.

Similarly, the second assembly 100-2 may include a second pulley 110-2 including a plastic composite 111-2 disposed inside thereof, a second core 120-2 including a second electromagnetic induction coil 121-2 disposed in an internal space of the second plastic composite structured pulley 110-2, and a second clutch 130-2 including a contact portion including a plastic composite 131-2 in contact with a bottom-end surface of the second pulley 110-2. Preferably, magnetic forces 10-1, 10-2 may be generated when electric current is applied.

The aluminum pulley may be a paramagnetic body and thus may not be utilized because it cannot transmit magnetic force being generated from the coil to the clutch. In order to complement this, the aluminum pulley may be made into a composite structure by injection molding plastic including ferromagnetic alloy material onto an aluminum body thereof. As such, a passage allowing magnetic force to be transmitted through the body of the aluminum pulley may be obtained so that the clutch may be normally driven.

In addition, the steel clutch may be also made by injection molding the plastic including ferromagnetic alloy material which may be the same as or different from that in the aluminum pulley on a contact portion thereof in contact with the pulley so that response characteristic of the clutch may increase and any frictional material may be eliminated through improvement of slip characteristic.

Particularly, each of the plastic composite members 111-1 and 111-2 may have a thickness of at least about 3t (e.g., about 3 mm) at the thinnest portion of a surface area adjacent to the electromagnetic induction coils 121-1 and 121-2. Therefore, the magnetic field formed by the electromagnetic induction coils 121-1 and 121-2 may be continuously transmitted.

Figure 2:
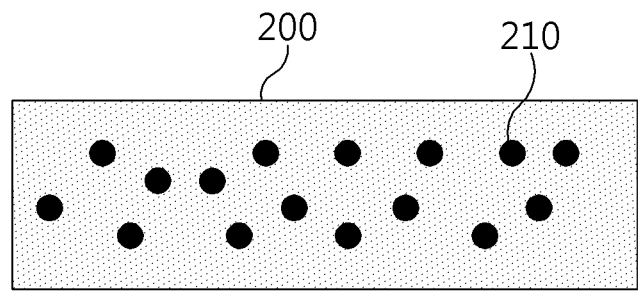
FIG. 2 is a cross section of the plastic composite shown in FIG. 1.

FIG. 2 is a cross section of the plastic composites 111-1, 111-2, 131-1 and 131-2 shown in FIG. 1. As shown in FIG. 2, the plastic composite may be of a structure in which the magnetic alloy powder 210 may be impregnated into the plastic material 200. The plastic composites 111-1, 111-2, 131-1 and 131-2 may include the magnetic alloy powder of at least about 20% by volume on the basis of the volume of the plastic composite. The magnetic alloy powder 210 may include iron, cobalt, nickel, or alloys thereof and the like. Preferably, a rare-earth magnet alloy powder may also be used.

Figure 3:
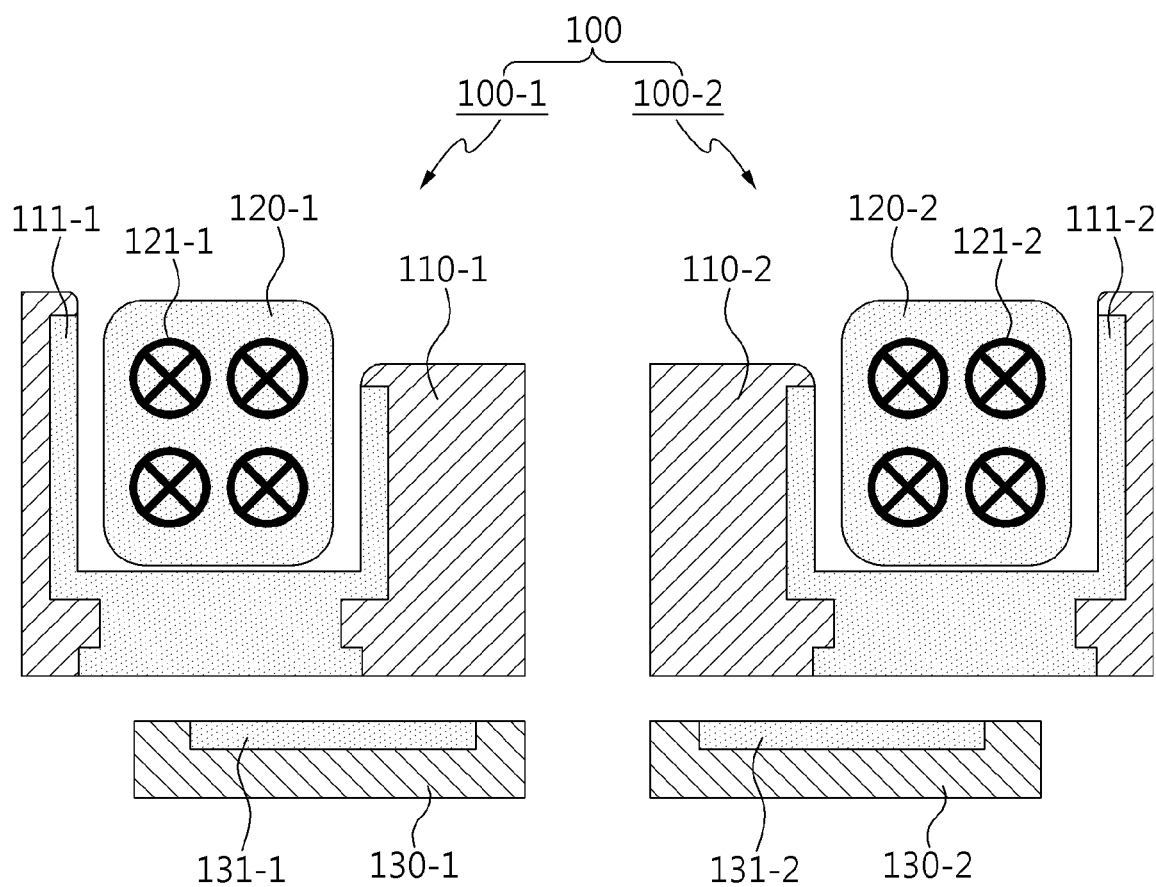
FIG. 3 is an exemplary air conditioner compressor shown in FIG. 1 before it is driven.

FIG. 3 shows an exemplary air conditioner compressor 100 shown in FIG. 1 before it is driven. As shown in FIG. 3, prior to operation of the air conditioner compressor 100, the pulleys 110-1 and 110-2 may be separated from the plastic composite structured clutches 130-1 and 130-2 so that the air conditioner compressor may not be driven.

Figure 4:
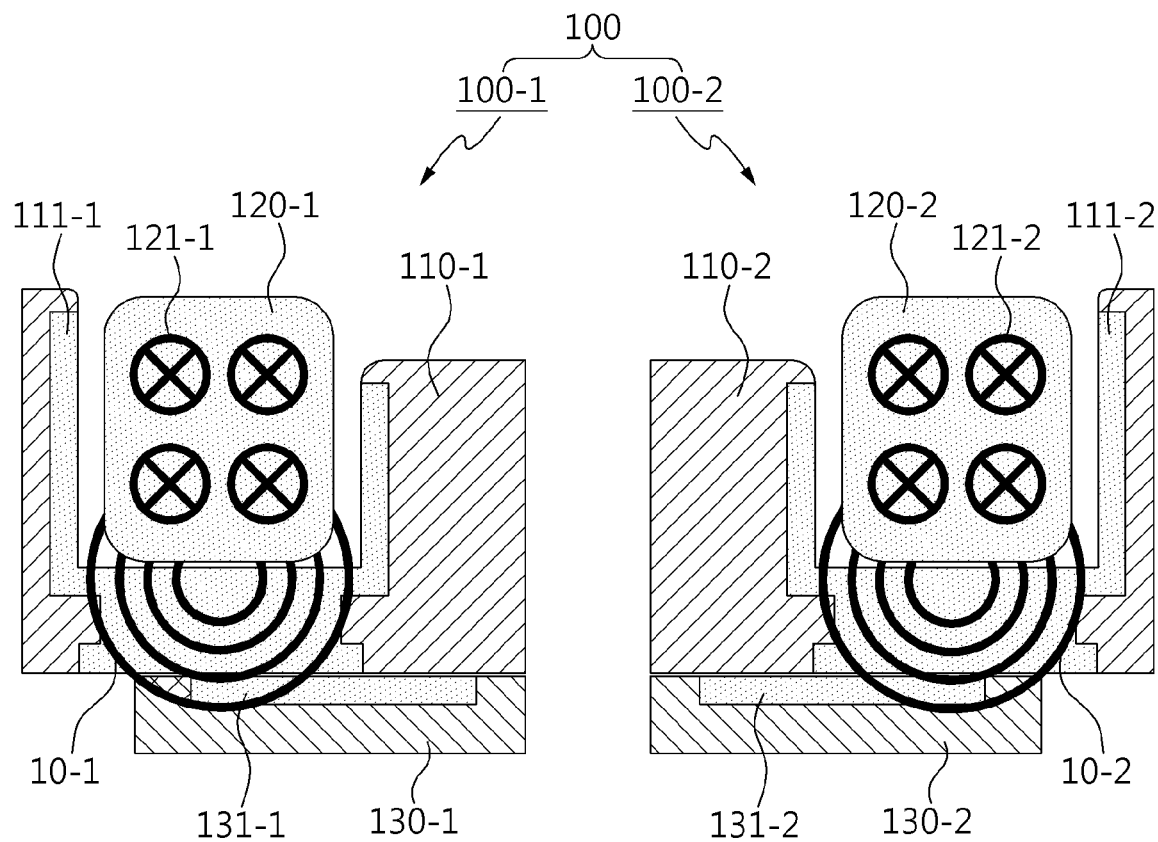
FIG. 4 is an exemplary air conditioner compressor shown in FIG. 1 after it is driven.

FIG. 4 shows an exemplary air conditioner compressor shown in FIG. 1 after it is driven. As shown in FIG. 4, when the air conditioner compressor 100 is operated (i.e., electric current is applied), magnetic force may be generated in the electromagnetic induction coils 121-1 and 121-2 and transmitted through the plastic composite structured pulleys 110-1 and 110-2 to the clutches 130-1 and 130-2. As a result, the pulleys and the clutches may come into contact with each other and driving force transmitted from an engine (not shown) may be transmitted to the air conditioner compressor 45 so that the air conditioner compressor may be operated.

Figure 5:
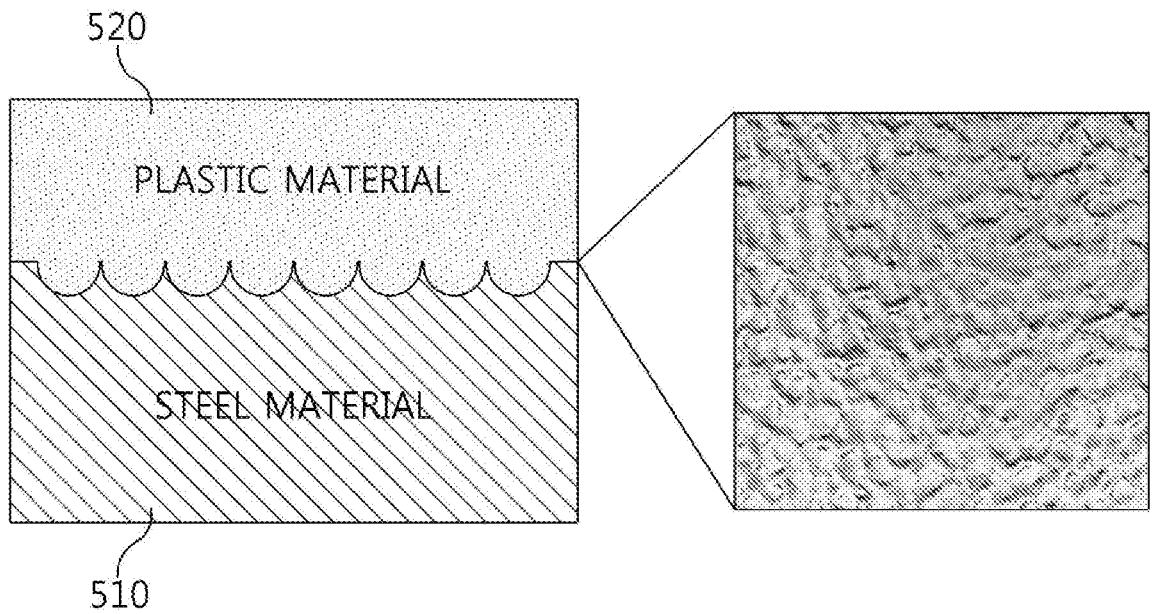
FIG. 5 is an exemplary steel-plastic composite according to an exemplary embodiment of the present invention.

FIG. 5 shows an exemplary steel-plastic composite according to an exemplary embodiment of the present invention. In other words, FIG. 5 shows another structure in manufacturing an exemplary clutches 130-1 and 130-2 shown in FIG. 1. As shown in FIG. 5, the clutch may be made by forming dimples on a surface of a steel material 510 and laminating the plastic composite on the dimpled surface of the steel material, for example, by means of injection molding, such that bonding force may be reinforced through enlargement of surface area. The dimples may be suitably formed on the top surface of the prepared steel material 510 by impacting steel balls or ceramic balls thereon by high-speed injection.

The plastic composite 520 may be formed on the top surface of the steel material 510 by putting into a mold and injection molding the plastic in liquid phase containing the magnetic alloy powder and the steel material 510. A representation showing such a dimpled surface is illustrated as a partial enlarged view on the right side of the figure.

Figure 6:
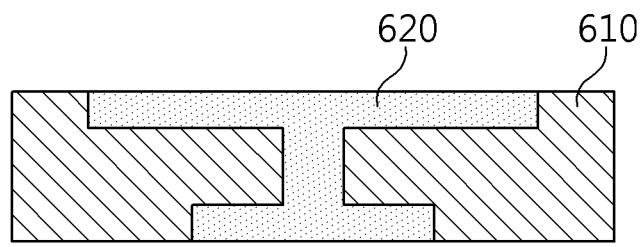
FIG. 6 is an exemplary steel-plastic composite according to still an exemplary embodiment of the present invention.
Figure 7:
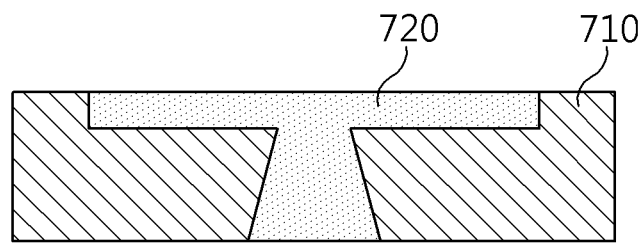
FIG. 7 is an exemplary steel-plastic composite according to an embodiment of the present invention.
Figure 8:
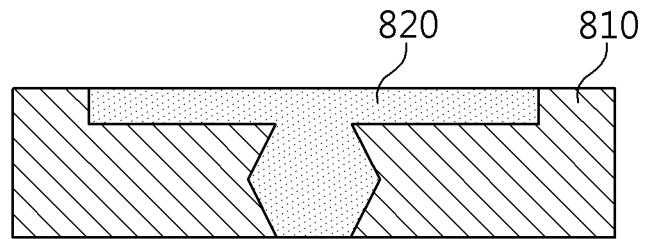
FIG. 8 is an exemplary steel-plastic composite according to an exemplary embodiment of the present invention.

FIGS. 6 to 8 show exemplary structures of an exemplary steel-plastic composite according to an exemplary embodiment of the present invention. As shown in FIGS. 6 to 8, shapes of plastic composites 620, 720 and 820 may be of reverse gradient shapes, i.e. a shape of a cross-section area of the plastic composite having an upper end longer than a lower end, so as to correspond to reverse gradient shapes formed inside the steel materials 610, 710 and 810, respectively.

For example, the plastic composite 620 shown in FIG. 6 may have an "I" shape cross-section area of which upper end may be longer than its lower end. The plastic composite 720 shown in FIG. 7 may have a "T" shape cross-section area that is getting wider toward its lower end. In addition, the plastic composite 820 shown in FIG. 8 may have a "T" shape cross-section area of which lower end is a hexagonal shape.

Figure 9:
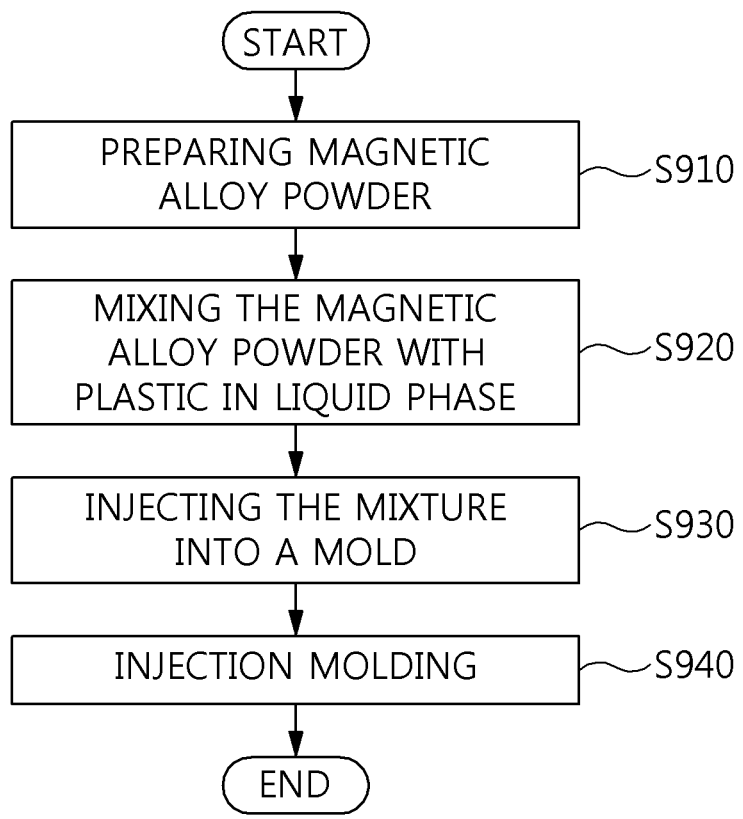
FIG. 9 is a flowchart showing an exemplary process of manufacturing an exemplary plastic composite according to an exemplary embodiment of the present invention.

FIG. 9 shows an exemplary process of manufacturing an exemplary plastic composite according to an exemplary embodiment of the present invention. As shown in FIG. 9, magnetic alloy powder may be first prepared in step S910. Thereafter, the prepared magnetic alloy powder may be mixed with plastic in liquid phase to produce a mixture in step S920. The mixture may be then injected into a mold and injection molded to produce an exemplary plastic structure in steps S930 and S940.

Example

Examples of the present invention will now be described in further detail along with comparative examples, but the present invention is not limited by the following examples.

As inventive examples and comparative examples, results of test confirming whether the clutch is driven or not while varying contents of Sm—Co magnetic powder and ferrite magnetic powder in an embodiment of the present invention are as follows:

TABLE 1

| Example | Sm—Co magnetic powder (%) | Content of ferrite magnetic powder (%) | Total content of magnetic powder (%) | Plastic injection molding Thickness (mm) | Whether clutch is driven or not |
|---|---|---|---|---|---|
| 1 | 10 | 9 | 19 | 3 | Not operated |
| 2 | 10 | 9.5 | 19.5 | 3 | Not operated |
| 3 | 10 | 10 | 20 | 3 | Operated |
| 4 | 10 | 10.5 | 20.5 | 3 | Operated |
| 5 | 10 | 11 | 21 | 3 | Operated |

In the Table 1 above, Examples 1 and 2 are comparative examples, while Examples 3 to 5 are inventive examples. As shown in the table above, when the total content of the magnetic powder was 20% by volume or greater, the clutch may be driven while magnetic field was formed.

The results of test for confirming whether the clutch was driven according to thickness of the plastic injection molding on condition that the minimum content of the magnetic powder was 20% by volume are as follows:

TABLE 2

| Example | Sm—Co magnetic powder (%) | Content of ferrite magnetic powder (%) | Total content of magnetic powder (%) | Plastic injection molding Thickness (mm) | Whether clutch is driven or not |
|---|---|---|---|---|---|
| 1 | 10 | 10 | 20 | 2.8 | Not operated |
| 2 | 10 | 10 | 20 | 2.9 | Not operated |

TABLE 2-continued

| Example | Sm—Co magnetic powder (%) | Content of ferrite magnetic powder (%) | Total content of magnetic powder (%) | Plastic injection molding Thickness (mm) | Whether clutch is driven or not |
|---|---|---|---|---|---|
| 3 | 10 | 10 | 20 | 3 | Operated |
| 4 | 10 | 10 | 20 | 3.1 | Operated |
| 5 | 10 | 10 | 20 | 3.2 | Operated |

As shown in the Table above, Examples 1 and 2 are comparative examples, while Examples 3 to 5 are inventive examples. As shown in the Table 2, when the thickness was 3t (i.e. 3 mm) or greater, the clutch was driven while magnetic field was formed.

While the present invention has been described with respect to the various exemplary embodiments, it will be apparent to those skilled in the art that various changes and modifications may be made without departing from the spirit and scope of the invention as defined in the following claims.

What is claimed is:

1. An air conditioner compressor comprising:
a pulley comprising a plastic composite;
a core comprising an electromagnetic induction coil and disposed in an internal space of the pulley; and
a clutch comprising a contact portion comprising the plastic composite in contact with the pulley,
wherein the plastic composite comprises an amount of 20% to 21% by volume of a magnetic alloy material on the basis of the total volume of the plastic composite,
wherein a thinnest portion of a surface area of the plastic composite in the pulley adjacent to the electromagnetic induction coil of the core has a thickness of 3 mm to 3.2 mm.

2. The air conditioner compressor of claim 1, wherein the plastic composite of the clutch is formed inside a steel material and a shape of a cross-section area of the plastic composite comprises an upper end longer than a lower end wherein the upper end is in contact with the pulley.

3. The air conditioner compressor of claim 2, wherein the shape comprises an "I" shape of which the upper end is longer than the lower end, a "T" shape that is getting wider toward its lower end, or a "T" shape having a hexagonal shaped lower end.

4. The air conditioner compressor of claim 1, wherein the magnetic alloy material is ferrite magnetic powder comprising iron, cobalt, nickel, or alloys thereof.

5. The air conditioner compressor of claim 4, wherein the magnetic alloy material further comprises a rare earth-based magnetic alloy powder.

6. The air conditioner compressor of claim 5, wherein the rare earth-based magnetic alloy material comprises a rare earth-cobalt magnetic powder.

7. A method of producing an air conditioner compressor, comprising:
applying a plastic composite to a pulley of the air conditioner compressor; and
applying the plastic composite to a clutch of the air conditioner compressor,
wherein the plastic composite comprises an amount of 20% to 21% by volume of a magnetic alloy material on the basis of the total volume of the plastic composite,
the method further comprises,
preparing the pulley by laminating the plastic composite on an aluminum material.

8. The method of claim 7, further comprising,
preparing the clutch by laminating the plastic composite on a surface of a straight plane of a steel material.

9. The method of claim 8, further comprising,
preparing the clutch by forming dimples on a surface of the steel material and laminating the plastic composite on the dimpled surface of the steel material.

10. The method of claim 9, wherein the dimpled surface is formed by injecting steel balls or ceramic balls at high speed.

11. The method of claim 8, wherein the plastic composite of the clutch is formed inside the steel material and a shape of a cross-section area of the plastic composite comprises an upper end longer than a lower end wherein the upper end is in contact with the pulley.

12. The method of claim 11, wherein the shape comprises an "I" shape of which the upper end is longer than the lower end, a "T" shape that is getting wider toward its lower end, or a "T" shape having a hexagonal shaped lower end.

13. A vehicle comprising an air conditioner compressor manufactured by a method of claim 7.

* * * * *